June 20, 1950     C. W. STEWARD ET AL     2,512,509
ELECTRIC WELDING TORCH
Filed Oct. 19, 1946
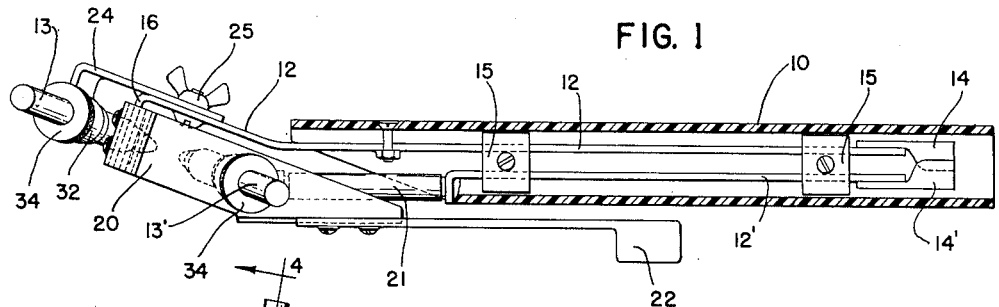
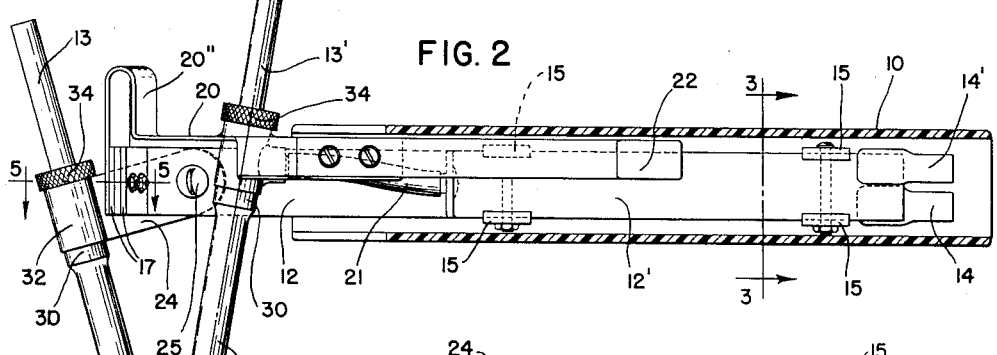
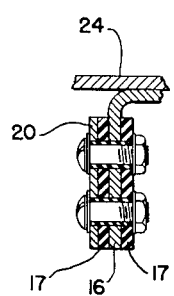 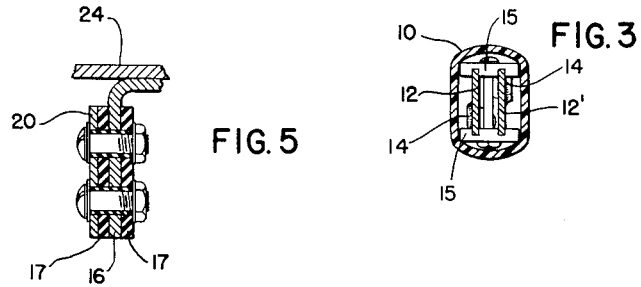
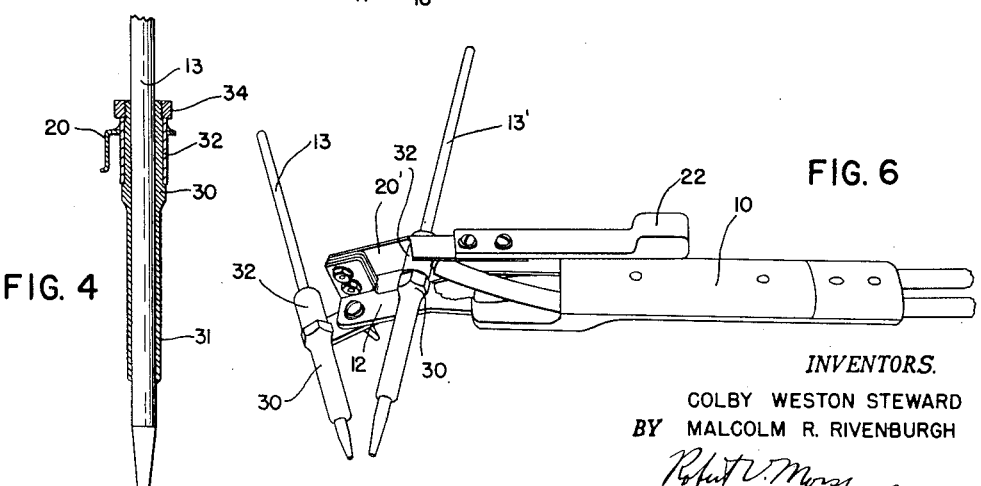
INVENTORS.
COLBY WESTON STEWARD
BY MALCOLM R. RIVENBURGH Patented June 20, 1950

2,512,509

UNITED STATES PATENT OFFICE 2,512,509

ELECTRIC WELDING TORCH

Colby Weston Steward, Kenmore, and Malcolm R. Rivenburgh, Williamsville, N. Y., assignors, by mesne assignments, to Cornell Aeronautical Laboratory, Inc., Buffalo, N. Y., a corporation of New York Application October 19, 1946, Serial No. 704,506

3 Claims. (Cl. 219—14)

This invention relates to electric arc welding, and particularly to improvements in the torch or holder with which a pair of carbons may be manipulated by one hand of the operator, leaving his other hand free to hold the metallic welding rod. In order to strike and control the arc for welding, the carbons are first brought together and then separated to give the desired arc. In the past, devices by which this could be done with one hand have been rather heavy and awkward, tending to tire the operator and retard his work. They have also been somewhat complicated to manufacture, and tended to heat unduly in use. The principal objects of the present invention are to reduce the weight and complexity of the electric torch so that it can be more easily handled; to shape it so as to permit longer and steadier traverse of the weld without twisting the body; to eliminate parts that might become loose or fall off; to reduce the heat loss from the carbons to the handle; to afford an easy resilient control; and various other objects that will become apparent as the description proceeds.

Referring now to the drawings forming part of this specification,

Fig. 1 is a plan view of the torch, with the outer part of the handle in section.

Fig. 2 is a side elevation view, with the outer part of the handle in section.

Fig. 3 is a cross-section of the handle taken on the line 3—3 of Fig. 2.

Fig. 4 is a cross-section taken on the line 4—4 of Fig. 2, showing the tube for holding the carbon.

Fig. 5 is a cross-section of the brackets and insulation taken on the line 5—5 of Fig. 2.

Fig. 6 is a perspective view of a modified form of the electric welding torch having a flat spring.

Similar reference numerals refer to similar parts throughout the various views.

As shown in Fig. 1 and Fig. 2, the torch consists of a handle 10 through which extend two electrical conductors 12 and 12' by which current is carried to the carbon electrodes 13 and 13'. The electricity is brought in from the usual external leads (not shown) which plug into the sockets 14 and 14' within the handle 10. In order to keep the handle 10 cool, it is made hollow as shown in cross-section in Fig. 3, and in Fig. 1 and Fig. 2, with the conductor bars 12 and 12' supported in the air by the clips 15 fitted into the handle. The air circulating freely through the hollow handle 10 helps to carry off the heat transmitted by the conductors 12 and 12' from the electrodes.

The conductor bar 12 extends out from the handle as shown in Fig. 1, and is bent or canted to the right in plan view, if the operator is right handed, (or to the left for left handed operators, as will be explained later), and then is bent at right angles to form a bracket 16 as shown in Fig. 1 and Fig. 5. Bolted to this bracket 16, and separated by insulation 17, is a flexible spring member 20, preferably consisting of a metal strip lying with its broad dimension transversely, i. e., horizontally when the torch is in use, so as to flex easily vertically. This spring 20 may be flat as shown at 20' in Fig. 6, or may be given added flexibility by an inverted U bend 20'' as shown in Fig. 2. The electrode 13' is carried by this spring 20 as will be described, and its position is regulated by a thumb lever 22 attached to the free end of the spring member 20. The spring 20 is electrically connected to the conductor 12' by the flexible lead 21. The lever 22 is made of fiber, wood or other suitable material which is a non-conductor of both heat and electricity. The other electrode 13 is carried in a holder 30, supported by a bracket 24 of conducting metal, which is clamped in any desired position by means of the wing-nut 25. This permits the initial position of the electrodes 13, 13' to be adjusted according to the work prior to the operation of the thumb lever 22, which is used for striking the arc and regulating it when the welding is in progress.

The construction of the electrode holders 30, which carry the carbon electrodes 13 and 13', is particularly adapted to reduce waste heat and permit interchangeability so that carbons of various diameters can be used. It also provides a simple and convenient means for adjusting the length of the carbon. These holders 30 are identical, each consisting of an elongated metal tube 31 having an internal diameter giving a frictional fit to the desired size carbon 13, so that it can be moved therein by the hand or by tapping the tool on the bench. While these tubes 31 may have various internal diameters according to the size of the carbons, the outer dimensions are all the same so as to fit interchangeably in the socket 32 in the bracket 24, or spring 20, and are clamped in place by the nuts 34.

When using an electrode torch, the operator generally stands in front of the work and moves the torch sideways, starting with his arm somewhat extended to the right (if he is right handed), and moving it towards his body as the weld progresses. With the ordinary torch, his position becomes somewhat cramped when his elbow reaches his body and he cannot proceed farther without twisting, and the length of the welding operation is thus limited. To overcome this difficulty and give the operator easier conditions for work, in the present invention the electrodes are not in line with the handle, but are canted in an oblique plane, by bending the extension 12 laterally, as shown in the plan view, so that when the torch is turned to come in front of the operator the electrodes can still be in the proper transverse plane for work. The torch as illustrated is for a right handed operator; for a left handed operator the extension 12 would be bent in the opposite direction and the thumb lever 22 would be on the other side of the handle 1.

By the elimination of many parts previously considered necessary, making flexible rather than pivot connections, and extending the tip holders to improve the cooling, and canting the handle, a lighter and handier tool is provided, and the element of fatigue in the operation is considerably reduced. The spring and thumb lever give a resilient and easy control, attained without the use of pivots or other wearing parts, which have complicated prior devices.

While we have in the foregoing described a certain specific form by way of example, it will be understood that it is merely for the purpose of illustration to make clear the principles of the invention, which is not limited to the particular form shown, but is susceptible to various modifications and adaptations in different installations as will be apparent to those skilled in the art without departing from the scope of the invention as stated in the following claims.

We claim:

1. In a welding torch, the combination of a handle, a resilient strip attached to the handle, said strip being flat in a plane transverse to the handle and bent in a plane vertical to the handle to increase its vertical flexibility, an electrical conductor connected to said strip, an electrode holder attached to said strip, a lever attached to said strip by which the electrode holder may be moved, said lever being operable vertically by the thumb in the normal operating position without changing the grip of the hand on the handle and a second electrode holder carried by the handle.

2. In a welding torch, the combination of a handle, a pair of electrodes supported by said handle, a conductor extending from said handle and canted laterally to one side relative to the handle and in a direction to bring the electrodes more in front of the operator's body without twisting his elbow, a resilient strip carried by said conductor, said strip being flat in the plane in which said conductor is canted and bent in a plane vertical thereto to increase its vertical flexibility, an electrode holder attached to said strip, a lever attached to said strip by which the electrode holder may be moved, said lever being operable vertically by the thumb in the normal operating position without changing the grip of the hand on the handle, a second electrode holder carried by the handle, and means for adjusting the position of said second electrode holder relative to the handle.

3. In a welding torch, the combination of a rigid, non-compressible handle adapted to be held in the fingers and palm of the hand in a normal position with the thumb above the fingers when operating, a spring attached to said handle, a thumb lever attached to said spring, said lever being mounted for vertical movement by the thumb only in the normal operating position without changing the grip of the hand on the handle, whereby finger fatigue is reduced, said thumb lever being sufficiently removed from the side of the handle so that it is distinct from the handle grip, an electrode holder attached to said spring and lever so that it may be resiliently moved by the thumb, a second electrode holder secured to said handle, and a pair of electrodes in said holders, said electrodes both extending down below said handle when it is horizontal and in said normal position so that the hand and both electrodes can operate above the molten metal of the weld, the electrodes, holders and spring forming the head of the torch, said head being canted at a lateral angle diverging from the longitudinal axis of the handle on the opposite side of the handle from that on which the thumb lever is located, so as to assist in maintaining the electrodes in a transverse position relative to the work when held in front of the body.

COLBY WESTON STEWARD.
MALCOLM R. RIVENBURGH.

REFERENCES CITED

The following references are of record in the file of this patent:

UNITED STATES PATENTS

| Number | Name | Date |
|---|---|---|
| 1,618,080 | Gibbons | Feb. 15, 1927 |
| 1,750,436 | Sounitza | Mar. 11, 1930 |
| 1,850,172 | Holslag et al. | Mar. 22, 1932 |
| 2,266,239 | Nielsen | Dec. 16, 1941 |
| 2,425,830 | Ross | Aug. 19, 1947 |